(12) United States Patent
Fourre et al.

(10) Patent No.: US 11,248,965 B2
(45) Date of Patent: Feb. 15, 2022

(54) PIXEL ARRAY OF A THERMAL PATTERN SENSOR, SENSOR ASSOCIATES WITH COIL HEATING LINES

(71) Applicants: IDEMIA IDENTITY & SECURITY FRANCE, Courbevoie (FR); COMMISSARIAT A L'ENERGIE ATOMIQUE ET AUX ENERGIES ALTERNATIVES, Paris (FR)

(72) Inventors: Joël-Yann Fourre, Courbevoie (FR); Jean-François Mainguet, Grenoble (FR)

(73) Assignees: IDEMIA IDENTITY & SECURITY FRANCE, Courbevoie (FR); COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/932,054

(22) Filed: Jul. 17, 2020

(65) Prior Publication Data

US 2021/0018371 A1    Jan. 21, 2021

(30) Foreign Application Priority Data

Jul. 18, 2019    (FR) ...................................... 1908169

(51) Int. Cl.
*G01J 5/34*    (2006.01)
*G01J 5/02*    (2006.01)
(Continued)

(52) U.S. Cl.
CPC ............... *G01J 5/34* (2013.01); *G01J 5/0205* (2013.01); *G06K 9/0002* (2013.01); *G01J 2005/345* (2013.01); *G06F 21/32* (2013.01)

(58) Field of Classification Search
None
See application file for complete search history.

(56) References Cited

U.S. PATENT DOCUMENTS 6,091,837 A    7/2000   Dinh

FOREIGN PATENT DOCUMENTS

EP    2385486 A1    11/2011
EP    3276585 A1     1/2018
(Continued)

OTHER PUBLICATIONS

Preliminary Research Report received for French Application No. 1908169, dated Apr. 17, 2020, 3 pages (1 page of French Translation Cover Sheet and 2 pages of original document).

*Primary Examiner* — Edwin C Gunberg
(74) *Attorney, Agent, or Firm* — Womble Bond Dickinson (US) LLP (57) ABSTRACT

The invention relates to a pixel matrix of a thermal pattern sensor comprising several rows and several columns of pixels, said matrix comprising:
an active thermal element formed by a thermosensitive material disposed between a lower layer and an upper layer, the lower layer being constituted by a plurality of first tracks made of electrically conductive material and extending along a first direction, said first tracks forming pixel columns;
a heating element, disposed on the active thermal element and forming a serpentine path, said heating element being constituted by a plurality of second tracks (L1, L2, L3, L4, L5, L6) made of electrically conductive material and connecting segments (w1, w2, w3, w4, w5, w6) made of electrically conductive material connected to the ends of the second tracks (L1, L2, L3, L4, L5, L6), said second tracks (L1, L2, L3, L4, L5, L6) extending in a second direction different from the first (Continued)

direction and forming lines of pixels, the second tracks being connected except for the first and last second tracks (L1, L2, L3, L4, L5, L6), by their respective ends to one of the ends of a second preceding track and a second following track by way of said connecting segments (w1, w2, w3, w4, w5, w6), the first and last second tracks each having a free end connected to a connecting segment.

10 Claims, 6 Drawing Sheets

(51) Int. Cl.
*G06K 9/00* (2006.01)
*G06F 21/32* (2013.01)

(56) References Cited

FOREIGN PATENT DOCUMENTS

| | | |
|---|---|---|
| EP | 3483787 A1 | 5/2019 |
| EP | 3492894 A1 | 6/2019 |
| EP | 3502639 A1 | 6/2019 |
| FR | 3044408 A1 | 6/2017 |
| FR | 3044409 A1 | 6/2017 |
| FR | 3069938 A1 | 2/2019 |
| WO | 2018/020176 A1 | 2/2018 |

PIXEL ARRAY OF A THERMAL PATTERN SENSOR, SENSOR ASSOCIATES WITH COIL HEATING LINES

GENERAL TECHNICAL FIELD

The invention relates to a thermal pattern sensor, for example a fingerprint sensor, performing active thermal detection and comprising a pixel matrix. The invention more particularly concerns a passive pixel matrix for such a sensor, i.e. without an active selection or amplification element (such as a diode or a transistor) for each pixel, but can also be applied to an active pixel matrix.

PRIOR ART

A fingerprint sensor includes thermal detection means. These thermal detection means can be pyroelectric elements, diodes, thermistors or any other temperature-sensitive element making it possible to convert a temperature variation into a variation in potential or electrical current.

From the documents U.S. Pat. No. 6,091,837, EP 2 385 486 A1 and WO 2018/020176 are known so-called "active" fingerprint sensors performing active thermal detection and comprising a passive pixel matrix.

Figure 1:
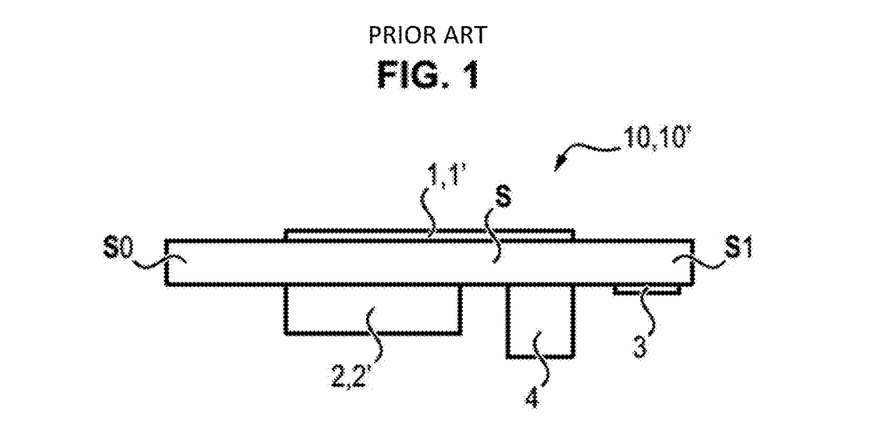

As illustrated in FIG. 1, a fingerprint sensor conventionally comprises a sensitive surface constituted by a matrix 1 of pixels disposed on a support S comprising a lower surface So and an upper surface S1.

Each pixel comprises a pyroelectric capacitor formed by two conductive electrodes between which a portion of pyroelectric material is disposed, and a heating element. This heating element dissipates a certain quantity of heat into the pixel and the heating of the pixel is measured after a certain acquisition time, known as the integration time, in the presence of the finger on the sensor. This makes it possible to distinguish, at the level of each pixel, the presence of a ridge or a furrow of the detected print according to whether the heat is absorbed by the skin (pixel in the presence of a ridge of the print) or retained in the pixel (pixel in the presence of a furrow in the print). This leads to a lower final temperature in the case of a pixel in the presence of a ridge, where the heat is absorbed by the skin, compared to a pixel in the presence of a furrow.

Figure 2:
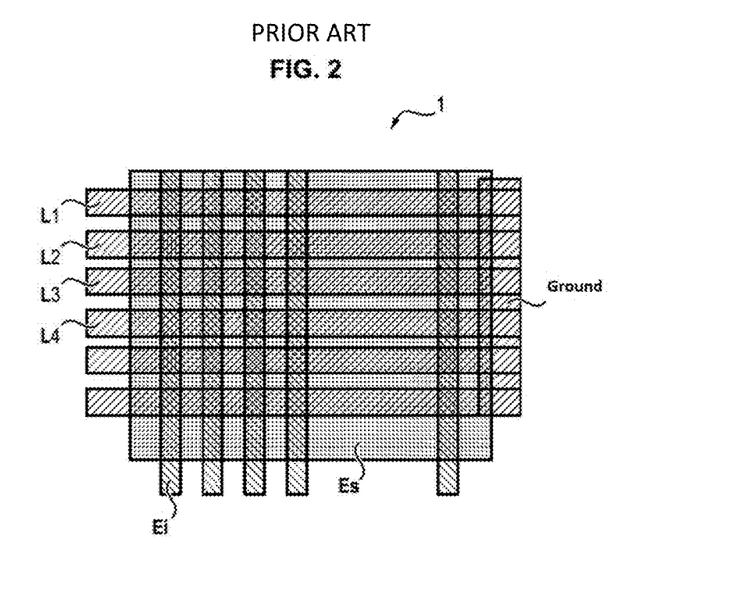

FIG. 2 illustrates a top view of a pixel matrix, forming a matrix of several rows and several columns, the rows being connected to the ground.

In this context, to perform the reading of the pixels, there are thus columns Ei for collecting the signal and rows $L_1, L_2, L_3, L_4$ for heating the pyroelectric material by applying a potential to the row. In particular, the rows $L_1, L_2, L_3, L_4$ are heated one after another to reconstitute the whole image of the print: a row is heated and all the columns are read, and so on.

To control the rows and read the electrical signals on each column, the sensor comprises an integrated circuit 2 such as an ASIC (Application-Specific Integrated Circuit).

The integrated circuit 2 is generally disposed under the sensitive surface on the surface opposite the support on which the sensitive surface is disposed (i.e. on the lower surface S0). Thus, to connect the integrated circuit 2 to the sensitive element it is necessary to make vias through the support S to send and retrieve the signals. Conventionally, the pixel matrix comprises 128 rows and 128 columns (i.e. a matrix of 128×128 pixels).

Consequently, to connect the pixel matrix to the integrated circuit 2, it is necessary to draw routing lines from the different rows or columns of the pixel matrix which must hold onto the surface of the support S.

This is not without problems, since the space available on the support S is limited and it is necessary to make provision for very small vias and very fine routing lines (finer than the rows or columns from which they come).

However, having vias of small size imposes a need for precise alignment between the two surfaces of the substrate so that the tracks coming from the rows and columns and those going toward the integrated circuit are indeed facing one another. Such a need for alignment increases the manufacturing cost of the sensor and decreases the efficiency of production of the sensor.

Furthermore, if the vias are small (150 μm) this requires routing lines finer than the rows or columns from which they come. This can be problematic, particularly for the heating.

OVERVIEW OF THE INVENTION

The invention palliates at least one of the aforementioned drawbacks.

For this purpose, the invention proposes, according to a first aspect, a pixel matrix of a thermal pattern sensor comprising several rows and several columns of pixels, said matrix comprising:
  an active thermal element formed by a thermosensitive material disposed between a lower layer and an upper layer, the lower layer being constituted by a plurality of first tracks made of electrically conductive material and extending along a first direction, said first tracks forming pixel columns;
  a heating element, disposed on the active thermal element and forming a serpentine path, said heating element being constituted by a plurality of second tracks made of electrically conductive material and is also constituted by connecting segments made of electrically conductive material connected to the ends of the second tracks, the connecting segments connecting second tracks to one another, said second tracks extending in a second direction different from the first direction and forming lines of pixels, the second tracks being connected except for the first and last second tracks, by their respective ends to one of the ends of a second preceding track and a second following track by way of said connecting segments, the first and last second tracks each having a free end connected to a connecting segment.

The invention, according to the first aspect of the invention, is advantageously completed by the following features, taken alone or in any one of their technically possible combinations:
  the second direction is perpendicular to the first direction.
  the matrix comprises the following successive layers, deposited on a substrate: a first layer made of electrically conductive material comprising the first tracks constituting the electrode; a second layer made of thermosensitive material covering the first tracks and leaving clear at least a part of the first tracks; a third layer made of electrically conductive material superimposed on the second layer, said third layer constituting the second electrode; a fourth layer made of dielectric material superimposed on the third layer; a fifth layer made of electrically conductive material comprising the heating element constituted by the plurality of second tracks and the connecting segments; a sixth protective layer.

the active thermal element is a pyroelectric capacitor, said thermosensitive material being a pyroelectric material, the lower layer forming a lower electrode and the upper layer forming an upper electrode.

the active thermal element is constituted by diodes or thermistors.

According to a second aspect, the invention relates to a thermal pattern sensor including: a support; a pixel matrix according to the first aspect of the invention disposed on the support; an integrated circuit disposed under the support, said control circuit being connected to the pixel matrix by routing lines made of an electrically conductive material extending from each of the segments.

The invention, according to the second aspect of the invention, is advantageously completed by the following features, taken alone or in any one of their technically possible combinations:

the routing lines and the connecting segments are disposed on different layers, the contact between the routing lines and the connecting segments being made by vias;

the routing lines and the connecting segments are made on the same layer;

the integrated circuit is configured to set each of the routing lines to a zero potential, i.e. to the ground, or +Vcc in order to allow the heating of one or more second tracks at once.

the integrated circuit is configured to make it possible to heat one line after another by applying a first same potential to the first segment corresponding to the line in the direction of the serpentine path and to the segments above and by applying a second potential, preferably different from the first, to the segments below.

the integrated circuit is configured to let a time period T elapse between two powerings of two successive segments, a time period T during which all the segments are set to the same potential.

The advantages of the invention are several.

By having the possibility of placing the vias all around the pixel matrix it is easier to route the signals toward the periphery of the ASIC silicon chip placed on the lower face, since the signals already come from the 4 sides (for example by placing the ASIC at the center of the sensor).

It is possible to test the continuity of the serpentine and therefore to test all the rows in a simplified manner.

The restrictions on the size of the vias are relaxed, vias larger than those usually used can be used.

These vias are furthermore less expensive: the restrictions on alignment between the metal levels are relaxed. This makes it possible to use substrates of moderate dimensional stability and/or having larger dimensions than those usually used. For example to guarantee an alignment at 30 μm on a sheet 300 mm long, it is necessary to use a substrate having deformations fewer than 0.1 for every thousand during the steps of production of the stack, and in particular the annealing. This can only be done on glass or with particularly stable polymers (most commonly thermally stabilized polyimides) laminated on glass sheets. If these restrictions are relaxed, less expensive substrates made of PEN (Poly-Ethylene Naphthalate), Polyimide or Polycarbonate for example, can be used, or else the films can be handled without bonding them on a leaf of glass.

OVERVIEW OF THE FIGURES

Other features, aims and advantages of the invention will become apparent from the following description, which is purely illustrative and non-limiting, and which must be read with reference to the appended drawings wherein, besides FIGS. 1 to 2 already discussed.

DETAILED DESCRIPTION OF THE INVENTION

A sensor according to the invention has the same structure as that in the introduction and comprises a support S comprising a lower surface $S_0$ and an upper surface $S_1$. Such a support S is for example a substrate made of PET or PEN or PI or else of CIU type (ABF, FR4) or else made of glass.

Figure 3:
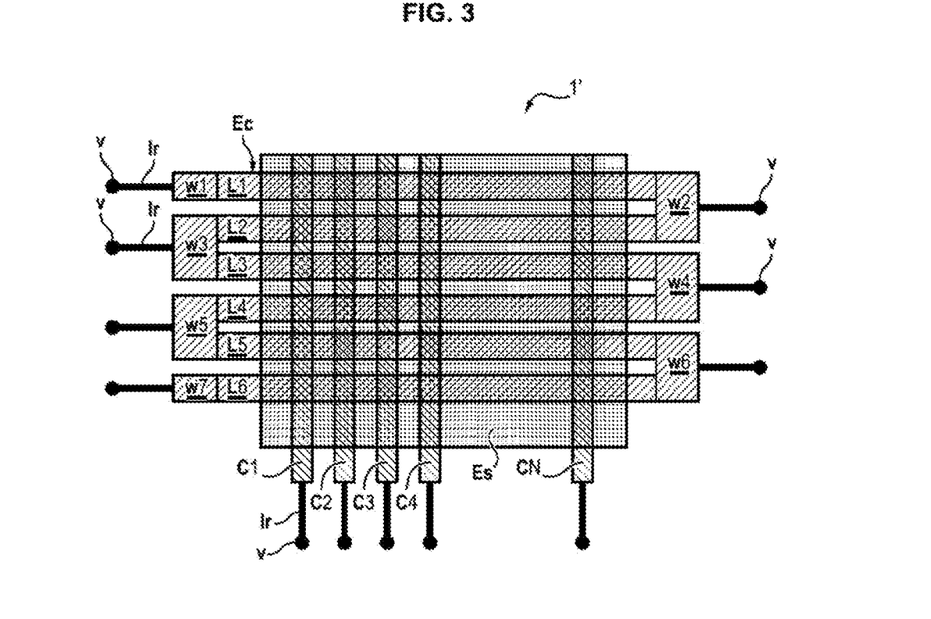
FIGS. 3, 3' and 3" illustrate a pixel matrix according to different embodiments of the invention.

On the upper surface $S_1$ is disposed a sensitive element 1', a top view of which is illustrated in FIG. 3 and is constituted by a pixel matrix comprising several rows and several columns of pixels.

On the lower surface S0 are disposed an integrated circuit 2' such as an ASIC, an element 4 (optional) and where applicable contacts 3 making it possible to connect the sensor to the contacts of a chip card when such a sensor is disposed on such a card. Of course, it can be connected to other systems (telephone, access control terminal etc.)

The invention described here notably aims to replace the pixel matrix 1 of FIGS. 1 and 2 with the pixel matrix 1' which will be described below, particularly in order to facilitate the connection of the pixel matrix by avoiding having complex routing lines. Such a pixel matrix 1' is illustrated in FIG. 3.

The matrix illustrated on FIG. 3 particularly comprises the following elements. An active thermal element formed by a thermosensitive material 20 disposed between a lower layer 10 and an upper layer 30. Preferably the active thermal element is a pyroelectric capacitor formed by a pyroelectric material disposed between a lower electrode $c_1, c_2, c_3, c_4, c_N$ and an upper electrode, Es. The lower electrode $c_1, c_2, c_3, c_4, c_N$ is constituted by a plurality of first tracks made of electrically conductive material which extend along a first direction. These first tracks form pixel columns.

A heating element Ec which forms a serpentine trace and which is constituted by a plurality of second tracks L1, L2, L3, L4, L5, L6 made of electrically conductive material and connecting segments w1, w2, w3, w4, w5, w6 made of electrically conductive material connected to the ends of the first tracks L1, L2, L3, L4, L5, L6.

The first tracks L1, L2, L3, L4, L5, L6 extend in a second direction, different from the first direction, and form lines of pixels. Advantageously, the second direction is perpendicular to the first direction. Furthermore, as will be further discussed below, the heating element Ec is above the pyroelectric material and is therefore not at the same level as that of the lower electrode $c_1, c_2, c_3, c_4, c_N$. Furthermore, the lines are straight here but this is not compulsory. Other shapes, for example zig-zags, can be envisioned.

It is the serpentine path of the heating element that makes it possible to facilitate the connection.

Specifically, this serpentine shape is made by connecting the rows pairwise, with the exception of the first and second rows of the pixel matrix 1'.

In particular, the rows are connected with the exception of the first and last, by their respective ends to one of the ends of a preceding row and of a following row by way of the connecting segments w1, w2, w3, w4, w5, w6, the first and second rows having a free end connected to a connecting segment.

For example on the example of FIG. 3:
The left end of the row L1 is connected alone to the segment w1;
The right end of the row L1 is connected with the right end of the row L2 to a segment w2;
The left end of the row L2 is connected with the left end of the row L3 to a segment w3;
The right end of the row L3 is connected with the right end of the row L4 to a segment w4;
The left end of the row L4 is connected with the left end of the row L5 to a segment w5;
The right end of the row L5 is connected with the right end of the row L6 to a segment w6;
The left end of the row L6 is connected alone to a segment w7.

Thus, it appears that on each side of the matrix, the pitch between two adjacent segments is the double of that of the rows. Consequently, the connection of the matrix is therefore facilitate as it is less dense than if all the rows had to be connected. This is true whatever the type of connection chosen: contact with the routing tracks if they are made at another level (the alignment and/or resolution requirements of this other level are relaxed) or with vias toward a metallic level on one face of the substrate which is not that directly in contact with the matrix. Concerning the columns $c_1$, $c_2$, $c_3$, $c_4$, $c_N$, they are meanwhile each connected to routing lines.

In FIG. 3, the connecting segments are connected to routing lines Ir themselves connected to vias v which are preferably aligned.

Still on this FIG. 3, the vias associated with each column are on the same side of the matrix but of course, provision can be made for them to be alternately on one side or the other, or else distributed irregularly on one side or the other of the matrix depending on the restrictions related to the connection of the matrix.

In this way the vias are distributed on each side of the pixel matrix and not on a single side as could be the case in particular of the pixel matrix of FIG. 2, where all the vias were of necessity on the side of the free end of the row of each heating element.

Alternatively, as illustrated in FIGS. 3' and 3", the integrated circuit 2' is placed on the same face as the pixel matrix 1' and preferably beside the pixel matrix 1'. In this case, it is favorable for the integrated circuit 2' to be assembled by flip-chip technology on a single metal level, for example the level embodying the columns (layer 10). It is then still necessary to make contacts between the metal level embodying the rows constituting the heating element (layer 50) and the connecting segments and the routing lines located on the same layer as the columns (layer 10).

As a replacement for the routing lines and the vias of FIG. 3, here provision is made for routing elements zm located on the same layer as the columns $c_2$, $c_3$, $c_4$, $c_N$ which are in contact with the metal segments.

Such a configuration makes it possible to relax restrictions on the alignment tolerances which are lower than when routing lines and vias are used.

Figure 4:
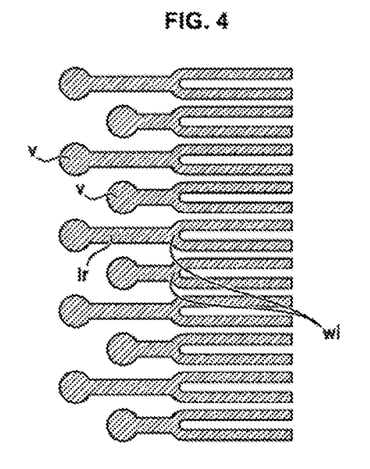
FIGS. 4 and 5 illustrate two examples of arrangement of vias and routing lines of a sensor according to the invention.

FIG. 4 illustrates an example of arrangement of the routing lines from the connecting segments of the heating element and the vias that extend from the routing lines. There is an alternation of routing lines of different dimensions, while the vias are of identical dimensions. With such an arrangement, provision can be made for vias of a diameter of 150 μm and routing lines of a thickness of 60 μm. Furthermore, the matrix typically has a pitch of 80 μm.

Figure 5:
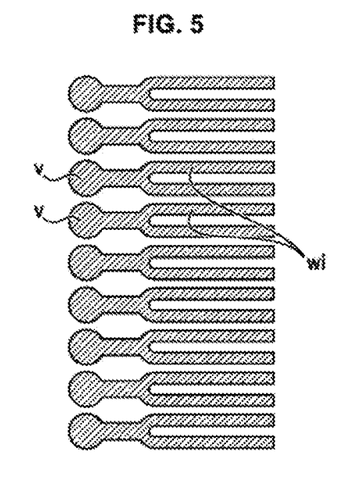

FIG. 5 illustrates an example of an arrangement on which the vias have a diameter of 130 μm with a spacing of 30 μm. Unlike the arrangement of FIG. 4 the vias are aligned with a pitch of 160 μtwice the pitch of 80 μm of the lines of the heating element (thickness of 40 μm and spacing of 40 μm).

In order to control the different lines of the heating element to heat them, provision must be made for a control logic taking into account the pairwise connection of the rows. To do this, the integrated circuit is programmed to set each of the rows to a potential of zero or +Vcc in order to permit the heating of one or more rows at once. Furthermore, between two heatings of rows, the integrated circuit is preferably programmed to let a cooling time elapse that is longer than the time period during which the rows are heated. To do this, the integrated circuit 2' is configured to allow a time period T to elapse between two powerings of two successive segments, a time period T during which all the segments are set to the same potential.

Below is a description of a control logic according to several heating configurations.

To heat a single row it is necessary that, in the direction of the serpentine path, the first segment corresponding to the row to be heated be at a first potential (for example +Vcc) as well as the preceding segments, while the following segments are set to a second potential (for example to the ground).

According to this logic it is therefore possible to heat each row one after another in a sort of voltage wave that propagates along the serpentine path (from top to bottom in FIG. 3).

The logic can be as follows:
off: all to the ground;
row L1: w1=Vcc, w2 w3 w4 w5 w6 w7=ground;
row L2: w1 w2=Vcc, w3 w4 w5 w6 w7=ground;
row L3: w1 w2 w3=Vcc, w4 w5 w6 w7=ground;
row L4: w1 w2 w3 w4=Vcc, w5 w6 w7=ground;
row L5: w1 w2 w3 w4 w5=Vcc, w6 w7=ground;
row L6: w1,2,3,4,5,6=Vcc, w7=ground;
off: all to the ground or all to Vcc.

When all the rows are heated one after another, it may be advantageous to leave the row that has just been heated to cool before heating the next one.

The logic can therefore be as follows:
off: all to the ground;
row L1: w1=Vcc, w2 w3 w4 w5 w6 w7=ground during 1 ms (for example);
off: all to the ground during 3 ms (for example);
row L2: w1 w2=Vcc, w3 w4 w5 w6 w7=ground;
off: all to the ground;
row L3: w1 w2 w3=Vcc, w4 w5 w6 w7=ground;
off: all to the ground
row L4: w1 w2 w3 w4=Vcc, w5 w6 w7=ground;
off: all to the ground
row L5: w1 w2 w3 w4 w5=Vcc, w6 w7=ground;
off: all to the ground
row L6: w1 w2 w3 w4 w5 w6=Vcc, w7=ground;
off: all to the ground (it is possible to go back to row 1 to start again).

The order of heating of the rows is not limiting and it is possible to heat the rows out of order. This is especially beneficial in the case of an active matrix (with selection and/or amplification elements in each pixel).

To heat several rows at once, the logic can be the following, which involves the heating of rows L1 and L3 at once:

w1=Vcc;
w2=ground;
w3=ground;
w4 w5 w6 w7=Vcc.

According to this logic there is a change of voltage across the terminals of any row that must heat up. Thus, the starting point is an end (for example w1) with an arbitrary voltage (for example Vcc or ground) and if the first must be heated then the voltage for the following segment is changed (w2 is set to the ground if w1 is set to Vcc for example) otherwise the same voltage is retained, and so on for the following rows.

To heat all the rows at once a first same potential is applied to all the segments located on one and the same side of the pixel matrix, while also applying a second different potential to all the segments located on one and the same side opposite the side to which the first same potential is applied.

For example, in relation to FIG. 3, all the even-numbered segments (on the right) are set to Vcc, and all the odd-numbered ones (on the left) to the ground.

It is also possible to set the last segment w7 to the ground and the first segment w1 to Vcc (or else a higher voltage), having been careful to set all the other segments to "high impedance", i.e. that no potential is applied (it is necessary to use 3-state drivers: either ground, or Vcc, or nothing (the 2 transistors of the output inverter that controls the connecting segments are not conductive).

This configuration makes it possible to check the continuity of the serpentine shape and therefore of all the rows in a single measurement (whereas with the preceding structure of FIG. 2, it was advisable to test each row).

Figure 6:
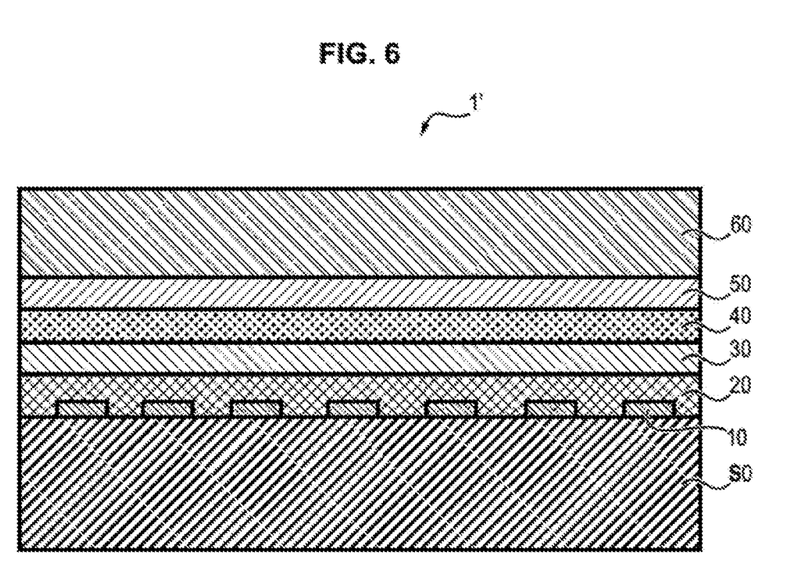
FIG. 6 illustrates a stack of layers of a sensor according to the invention. On all the figures similar elements bear identical reference numbers.

The above matrix that is shown comprises, as illustrated in FIG. 6, several successive layers, disposed on the upper surface S1 of the support S, which is preferably a substrate made of PET, PEN, PI or else of CIU type (ABFn, FR4, . . . ) or else made of glass.

The support S has a thickness between 75 and 200 µm when it is made of PET or PEN. When it is made of PI, the thickness of the support S can be between 20 and 100 µm, typically 25 µm. When it is made of glass, the thickness of the support S is typically between 300 and 700 µm.

A first layer 10 is constituted by a pattern made of electrically conductive material (for example, Au, Ag, Al or Cu) including the columns. A second layer 20 is constituted by a pyroelectric material composed of a copolymer P(VDF-TrFE) (Poly(vinylidene fluoride-co-trifluoroethylene)) which covers the columns of the first layer 10. The third layer 30 is made of electrically conductive material (for example, Au, Ag, Al or Cu). The fourth layer 40 is made of dielectric material. The fifth layer 50 is constituted by a pattern made of electrically conductive material delineating the heating element (for example, Au, Ag, Al or Cu). The sixth layer 60 is a protective layer made of polymer material (for example acrylate or siloxane) where applicable filled with inorganic particles (e.g. SiO2 or TiO2), or an inorganic layer such as DLC (Diamond-like carbon), SiO2 or Al2O3 or a stack of several layers. Advantageously, the different layers have the following thicknesses:

First layer 10: less than 1 µm, typically between 50 nm and 250 nm or else between 3 µm and 15 µm.
Second layer 20: between 2 and 5 µm
Third layer 30: less than 1 µm, typically between 50 nm and 700 nm
Fourth layer 40: between 0.5 nm and 1.5 µm
Fifth layer between 50 nm and 3 µm;
Sixth layer between 1 and 25 µm or 50 µm or 10 µm.

The second, third, fourth, fifth and sixth layers are considered as thin films given their thickness and make it possible to provide quick transfer of heat along a vertical axis of the matrix. Furthermore, when the layer has a thickness of less than 1 µm then this layer is considered as thin which facilitates the production of the matrix. The first layer 10 (lower electrode), the second layer 20 and the third layer 30 (upper electrode) constitute the pyroelectric capacitance and the fifth layer 50 constitutes the heating element.

Alternatively, the third and fifth layers can be exchanged or else merged (if the fourth layer 40 between the two is removed).

Of course, the matrix and the sensor described here are not limited to those based on PVDF but can be adapted to other types of thermal sensor.

The invention claimed is:

1. A thermal pattern sensor including: a support (S); a pixel matrix (1'), disposed on the support (S); an integrated circuit (2') disposed under the support (S), the pixel matrix comprising several rows and several columns of pixels, said matrix comprising:
    an active thermal element (10, 20, 30) formed by a thermosensitive material (20) disposed between a lower layer (10, $c_1$, $c_2$, $c_3$, $c_4$, $c_N$) and an upper layer (30, Es), the lower layer (10, $c_1$, $c_2$, $c_3$, $c_4$, $c_N$) being constituted by a plurality of first tracks made of electrically conductive material and extending along a first direction, said first tracks forming pixel columns;
    a heating element (50), disposed on the active thermal element (10, 20, 30) and forming a serpentine path, said heating element being constituted by a plurality of second tracks (L1, L2, L3, L4, L5, L6) made of electrically conductive material and is also constituted by connecting segments (w1, w2, w3, w4, w5, w6) made of electrically conductive material connected to the ends of the second tracks (L1, L2, L3, L4, L5, L6), the connecting segments connecting second tracks (L1, L2, L3, L4, L5, L6) to one another, said second tracks (L1, L2, L3, L4, L5, L6) extending in a second direction different from the first direction and forming lines of pixels, the second tracks being connected except for the first and last second tracks (L1, L2, L3, L4, L5, L6), by their respective ends to one of the ends of a second preceding track and a second following track by way of said connecting segments (w1, w2, w3, w4, w5, w6), the first and last second tracks each having a free end connected to a connecting segment, the control circuit being connected to the pixel matrix (1') by routing lines (lm, zm) made of an electrically conductive material extending from each of the segments.

2. The thermal pattern sensor as claimed in claim 1, wherein the second direction is perpendicular to the first direction.

3. The thermal pattern sensor as claimed in claim 1 or claim 2, comprising the following successive layers, deposited on a substrate (S),
    a first layer (10) made of electrically conductive material comprising the first tracks constituting the electrode;
    a second layer (20) made of thermosensitive material covering the first tracks and leaving clear at least a part of the first tracks;
    a third layer (30) made of electrically conductive material superimposed on the second layer, said third layer constituting the second electrode;

a fourth layer (40) made of dielectric material superimposed on the third layer;

a fifth layer (50) made of electrically conductive material comprising the heating element constituted by the plurality of second tracks and the connecting segments;

a sixth protective layer (60).

4. The thermal pattern sensor as claimed in claim 1, wherein the active thermal element is a pyroelectric capacitor, said thermosensitive material being a pyroelectric material (20), the lower layer (10) forming a lower electrode and the upper layer forming an upper electrode.

5. The thermal pattern sensor as claimed in claim 1, wherein the active thermal element is constituted by diodes or thermistors.

6. The thermal pattern sensor as claimed in claim 1, wherein the routing lines (lr) and the connecting segments are disposed on different layers, the contact between the routing lines and the connecting segments being made by vias.

7. The thermal pattern sensor as claimed in claim 1, wherein the routing lines and the connecting segments are made on the same layer.

8. The thermal pattern sensor as claimed in claim 7, wherein the integrated circuit (2') is configured to let a time period T elapse between two powerings of two successive segments, a time period T during which all the segments are set to the same potential.

9. The thermal pattern sensor as claimed in claim 1, wherein the integrated circuit (2') is configured to set each of the routing lines to a zero potential, i.e. to the ground, or +Vcc in order to allow the heating of one or more second tracks at once.

10. The thermal pattern sensor as claimed in claim 1, wherein the integrated circuit (2') is configured to make it possible to heat one line after another by applying a first same potential to the first segment corresponding to the line in the direction of the serpentine path and to the segments above and by applying a second potential, preferably different from the first, to the segments below.

* * * * *